United States Patent
Kao

(10) Patent No.: US 9,405,341 B2
(45) Date of Patent: Aug. 2, 2016

(54) ETHERNET POWER SOURCE EQUIPMENT

(71) Applicant: HON HAI PRECISION INDUSTRY CO., LTD., New Taipei (TW)

(72) Inventor: Chih-Chang Kao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 98 days.

(21) Appl. No.: 14/481,415

(22) Filed: Sep. 9, 2014

(65) Prior Publication Data

US 2015/0277522 A1 Oct. 1, 2015

(30) Foreign Application Priority Data

Mar. 31, 2014 (TW) ................................ 103112032

(51) Int. Cl.
*G06F 1/26* (2006.01)
*H04L 12/10* (2006.01)

(52) U.S. Cl.
CPC . *G06F 1/26* (2013.01); *H04L 12/10* (2013.01)

(58) Field of Classification Search
CPC ................................ G06F 1/266; H04L 12/10
See application file for complete search history.

(56) References Cited

U.S. PATENT DOCUMENTS

| 2009/0172656 A1* | 7/2009 | Landry | G06F 1/266 717/173 |
| 2010/0007220 A1* | 1/2010 | Lo | H04L 12/10 307/151 |
| 2013/0076133 A1* | 3/2013 | Gammel | H02J 4/00 307/31 |

FOREIGN PATENT DOCUMENTS

| TW | 200939007 | 9/2009 |
| TW | M373608 | 2/2010 |
| TW | 201320650 | 5/2013 |
| TW | 201410988 | 3/2014 |

* cited by examiner

*Primary Examiner* — Albert Wang
(74) *Attorney, Agent, or Firm* — ScienBiziP, P.C.

(57) ABSTRACT

An Ethernet PSE includes a processor, a plurality of POE ports, a plurality of port modules, a switch module, a detection circuit, and a power supply module. Each of the port modules supplies power to a PD via each of the POE ports. The switch module connects the processor to or disconnects the processor from each of the port modules according to control signals so that the processor can selectively communicate with each of the port modules. The detection circuit determines whether each of the POE ports is connected to the PD or not, outputting a detection signal corresponding to each of the POE ports. The power supply module supplies power to the processor, the plurality of port modules, the switch module, and the detection circuit. The processor controls operation states of the plurality of port modules and the switch module according to the detection signals.

8 Claims, 3 Drawing Sheets

ETHERNET POWER SOURCE EQUIPMENT

FIELD

The disclosure relates to power source equipment, and particularly to power source equipment (PSE) used in a power over Ethernet (POE) system.

BACKGROUND

In a power over Ethernet (POE) system, a power source equipment (PSE) comprises a plurality of POE ports, and supplies power to a power device (PD) via the POE ports.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

Figure 1:
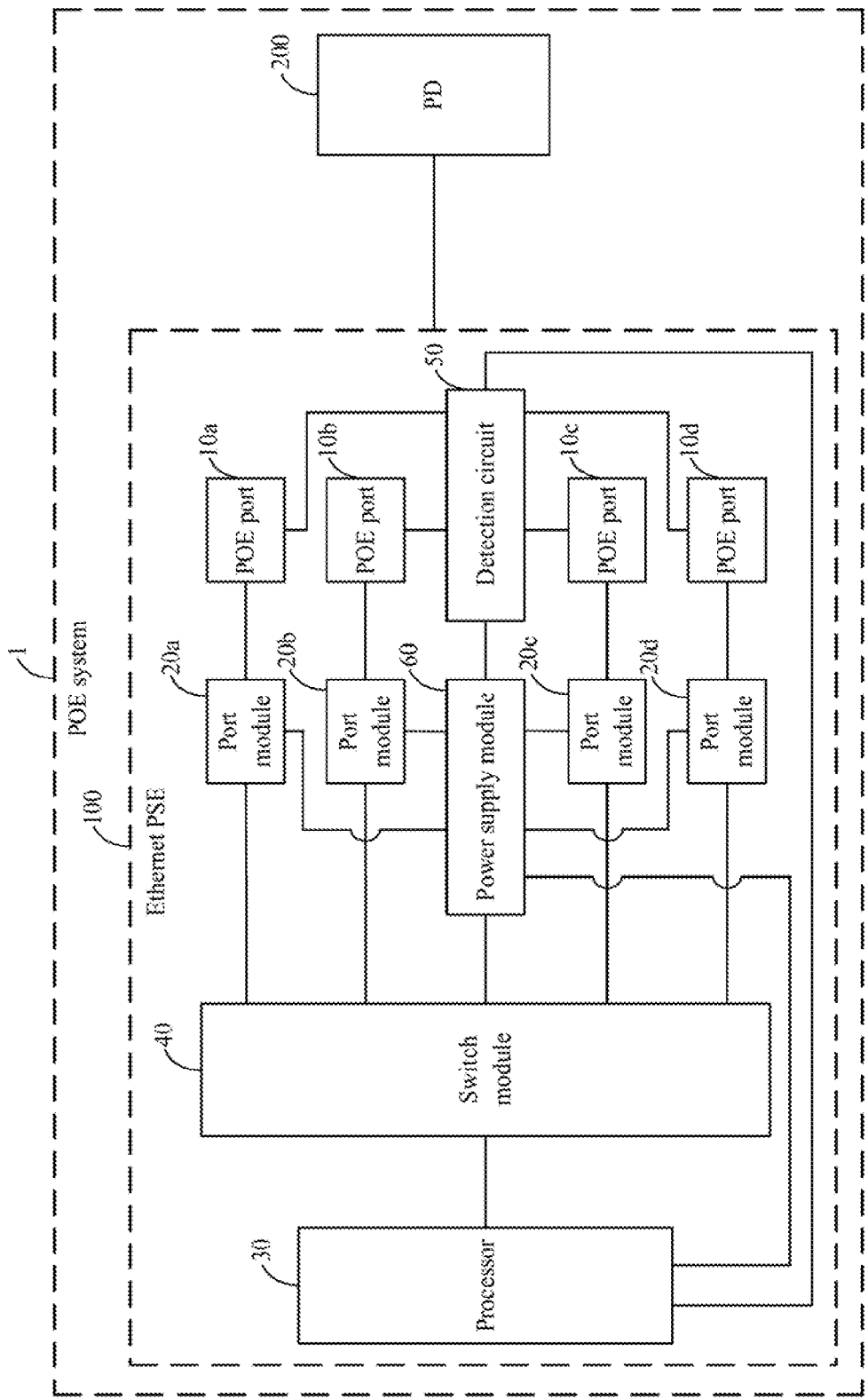
FIG. 1 is a schematic diagram of a first embodiment of a POE system. The POE system comprises an Ethernet PSE and a PD.

The disclosure is illustrated by way of example and not by way of limitation in the figures of the accompanying drawings in which like reference numerals indicate similar elements. It should be noted that references to "an" or "one" embodiment in this disclosure are not necessarily to the same embodiment, and such references can mean "at least one."

FIG. 1 illustrates a schematic diagram of a first embodiment of a power over Ethernet (POE) system 1. In one embodiment, the POE system 1 comprises an Ethernet power source equipment (PSE) 100 and a powered device (PD) 200. The Ethernet PSE 100 comprises a plurality of POE ports 10a, 10b, 10c, 10d (four shown as a non-limiting example), a plurality of port modules 20a, 20b, 20c, 20d (four shown as a non-limiting example), a processor 30, a switch module 40, a detection circuit, and a power supply module 60. Each of the port modules 20a, 20b, 20c, 20d is connected to each of the POE ports 10a, 10b, 10c, 10d, respectively, and a number of the POE ports 10a, 10b, 10c, 10d is equivalent to a number of the port modules 20a, 20b, 20c, 20d. Each of the port modules 20a, 20b, 20c, 20d can independently supply power to the PD 200 via each of the POE ports 10a, 10b, 10c, 10d.

In one embodiment, each of the port modules 20a, 20b, 20c, 20d comprise a physical layer (PHY) chip (not shown) and a peripheral circuit (not shown). The peripheral circuit comprises necessary elements that can make the PHY chip work in a normal state to transmit Ethernet data. In other embodiments, each of the port modules 20a, 20b, 20c, 20d can be known communication modules that transmit Ethernet data, i.e., communication modules that already exist in current technology.

The switch module 40 is connected to the processor 30 and the port modules 20a, 20b, 20c, 20d. The switch module 40 connects the processor 30 to or disconnects the processor 30 from each of the port modules 20a, 20b, 20c, 20d according to control signals output by the processor 30 so that the processor 30 can selectively communicate with each of the port modules 20a, 20b, 20c, 20d.

The detection circuit 50 is connected to the processor 30 and the POE ports 10a, 10b, 10c, 10d. The detection circuit 50 determines whether each of the POE ports 10a, 10b, 10c, 10d is connected to the PD 200 or not to output a detection signal corresponding to each of the POE ports 10a, 10b, 10c, 10d.

The power supply module 60 is connected to the processor 30, the port modules 20a, 20b, 20c, 20d, the switch module 40, and the detection circuit 50. The power supply module 60 supplies power to the processor 30, the port modules 20a, 20b, 20c, 20d, the switch module 40, and the detection circuit 50. The processor 30 further controls operation states of the port modules 20a, 20b, 20c, 20d and the switch module 40 according to the detection signals output by the detection circuit 50.

In one embodiment, the processor 30 obtains connection states of the POE ports 10a, 10b, 10c, 10d via the detection circuit 50. The detection circuit 50 outputs a first detection signal when the detection circuit 50 detects the POE port not connected to the PD 200 and the detection circuit 50 outputs a second detection signal when the detection circuit 50 detects the POE port connected to the PD 200.

In one embodiment, when the detection circuit 50 detects that the POE ports 10a, 10b, 10c are connected to the PD 200, and that the POE port 10d is not connected to the PD 200. The processor 30 controls the power supply module 60 to supply power to the port modules 20a, 20b, 20c, and to stop supplying power to the port module 20d, making the port module 20d and the POE port 10d fully power off. When the port module 20d and the POE port 10d are fully powered off, a consumption power of the port module 20d and the POE port 10d is zero.

Figure 2:
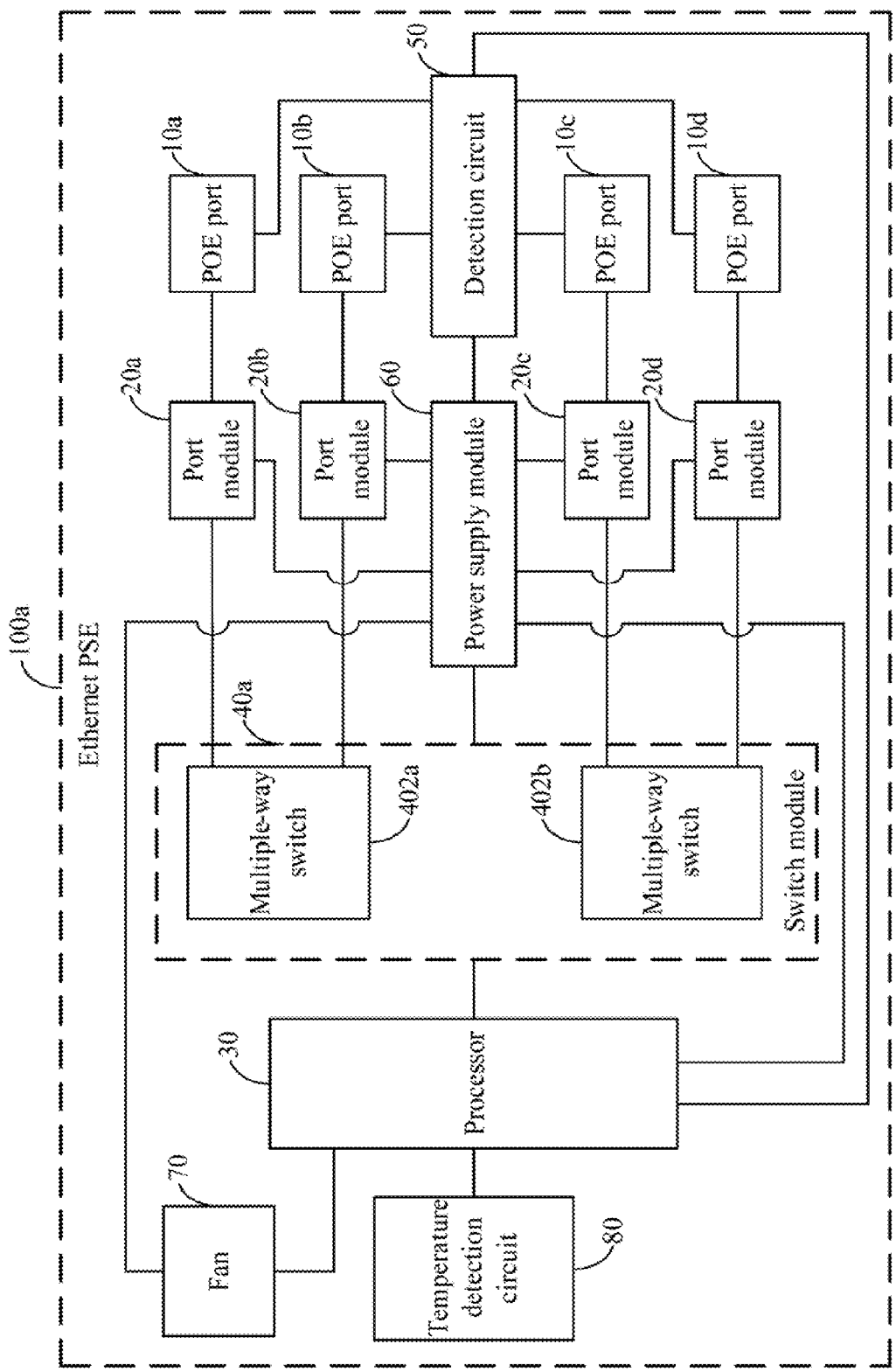
FIG. 2 is a schematic diagram of a first embodiment of an Ethernet PSE.

FIG. 2 is a schematic diagram of a first embodiment of an Ethernet PSE 100a. In one embodiment, the Ethernet PSE 100a is similar to the Ethernet PSE 100 of the first embodiment. The difference between the Ethernet PSE 100a and the Ethernet PSE 100 is that the Ethernet PSE 100a further comprises a fan 70 and a temperature detection circuit 80, and a switch module 40a further comprises a plurality of multiple-way switches 402a, 420b (two shown as example). The fan 70 is connected to the power supply module 60, and is configured to dissipate heat from the Ethernet PSE 100a. The temperature detection circuit 80 detects an operation temperature of the Ethernet PSE 100a, and the processor 30 adjusts a rotating speed of the fan 70 according to the operation temperature detected by the temperature detection circuit 80. When the operation temperature is less than a predetermined value, the Ethernet PSE 100a does not need heat dissipation, and the processor 30 further controls the power supply module 60 to stop supplying power to the fan 70. The processor 30 adjusts the operation state of the fan 70 according to the operation temperature of the Ethernet PSE 100a, to stop the Ethernet PSE 100a from overheating.

In one embodiment, the multiple-way switches 402a, 420b are two-way switches. The number of the port modules 20a, 20b, 20c, 20d is four so that the switch module 40 comprises two two-way switches. The multiple-way switch 402a is connected to the processor 30 and the port modules 20a and 20b. The multiple-way switch 402a connects the processor 30 to or disconnects the processor 30 from the port modules 20a, 20b according to the control signals output by the processor 30 so that the processor 30 can selectively communicate with the port modules 20a, 20b. The multiple-way switch 402b is connected to the processor 30 and the port modules 20c, 20d.

The multiple-way switch 402b connects the processor 30 to or disconnects the processor 30 from the port modules 20c, 20d according to the control signals output by the processor 30 so that the processor 30 can selectively communicate with the port modules 20c, 20d.

In one embodiment, the number of the multiple-way switches 402a, 420b is determined by the number of the POE ports 10a, 10b, 10c, 10d, if the Ethernet PSE 100a comprises eight POE ports, the switch modules 40a can comprise four two-way switches, two four-way switches, or one eight-way switch.

In one embodiment, the processor 30 controls the operation states of the port modules 20a, 20b, 20c, 20d and the multiple-way switches 402a, 420b according to the detection signals output by the detection circuit 50. When the detection circuit 50 detects the POE ports 10c, 10d are not connected to the PD 200, and detects the POE ports 10a, 10b are connected to the PD 200. The processor 30 controls the power supply module 60 to supply power to the port modules 20a, 20b and the multiple-way switch 402a, and controls the power supply module 60 to stop supplying power to the port modules 20c, 20d and the multiple-way switch 402b. The POE ports 10c, 10d, the port modules 20c, 20d, and the multiple-way switch 402b are fully powered off to save energy. When the detection circuit 50 detects the POE port 10c or the POE port 10d connected to the PD 200, the processor 30 controls the power supply module 60 to supply power to the multiple-way switch 402b again.

Figure 3:
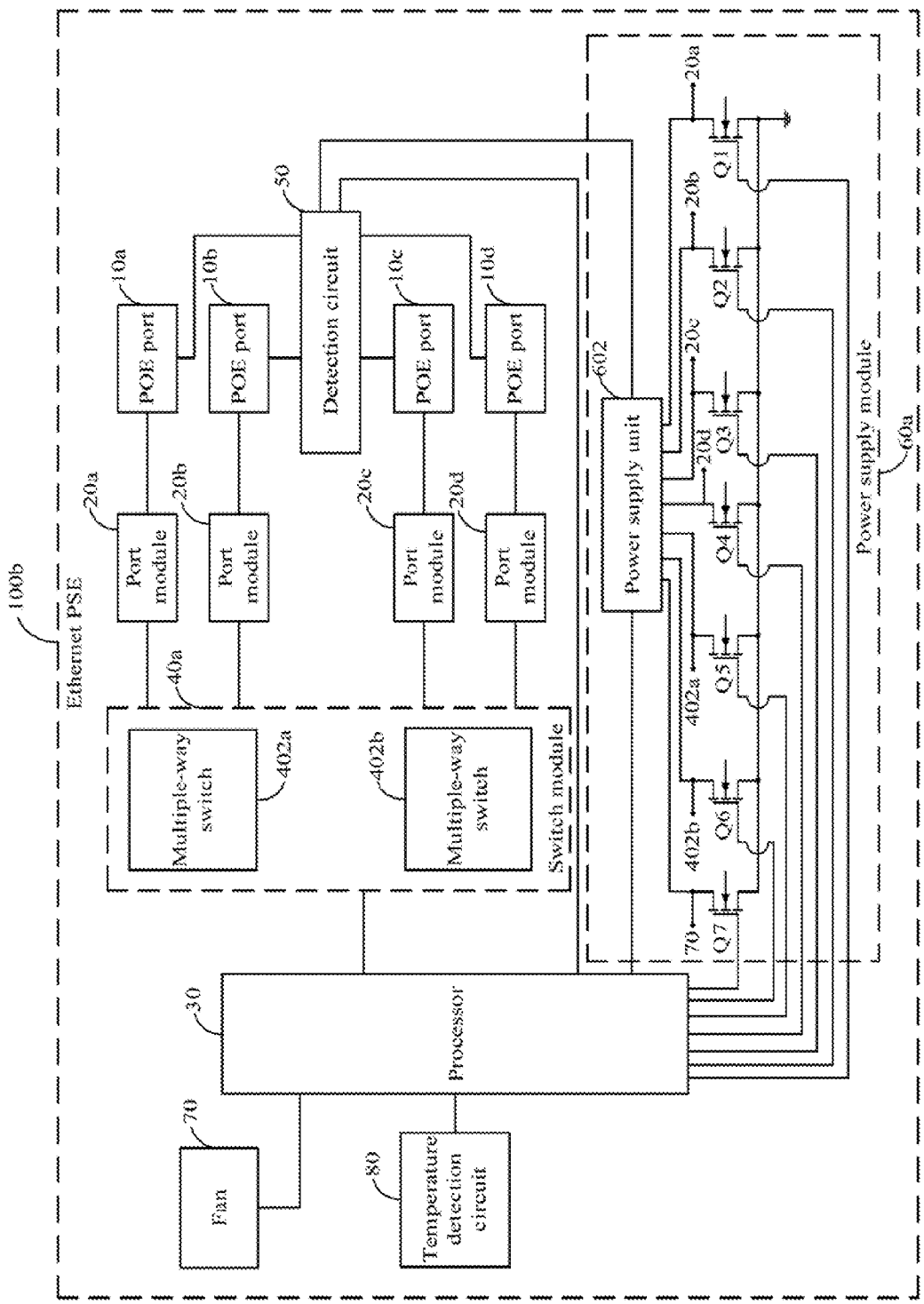
FIG. 3 is a circuit diagram of a second embodiment of an Ethernet PSE.

FIG. 3 is a circuit diagram of a second embodiment of an Ethernet PSE 100b. In one embodiment, the power supply module 60a comprises a power supply unit 602 and a plurality of electronic switches Q1, Q2, Q3, Q4, Q5, Q6, Q7 (seven shown as a non-limiting example). The power supply unit 602 outputs electric signals to supply power to the port modules 20a, 20b, 20c, 20d, the processor 30, the multiple-way switches 402a, 402b, and the detection circuit 50. Each of the electronic switches Q1, Q2, Q3, Q4, Q5, Q6, Q7 comprises a control terminal, a first terminal, and a second terminal. The control terminals of the electronic switches Q1, Q2, Q3, Q4, Q5, Q6, Q7 are connected to the processor 30, the first terminals of the electronic switches Q1, Q2, Q3, Q4 are connected to the port modules 20a, 20b, 20c, 20d, respectively. The first terminals of the electronic switches Q5, Q6 are connected to the multiple-way switches 402a, 402b, respectively, the first terminal of the electronic switches Q7 is connected to the fan 70, and the second terminals of the Q1, Q2, Q3, Q4, Q5, Q6, Q7 are grounded. The processor 30 controls the electronic switches Q1, Q2, Q3, Q4, Q5, Q6, Q7 turning on or off, to control the operation states of the port modules 20a, 20b, 20c, 20d, the multiple-way switches 402a, 402b, and the fan 70.

In one embodiment, the processor 30 can be a central processing unit (CPU) comprising the Ethernet PSE 100a. In other embodiments, the processor 30 can be a micro control unit (MCU), a programmable logic device (PLD), a complex programmable logic device (CPLD), and a field programmable gate array (FPGA).

In one embodiment, the number of the electronic switches Q1, Q2, Q3, Q4, Q5, Q6, Q7 is determined by the total number of the port modules 20a, 20b, 20c, 20d, the multiple-way switches 402a, 402b, and the fan 70. The number of the port modules 20a, 20b, 20c, 20d is four, and the number of the multiple-way switches 402a, 402b is two and so that the number of the electronic switches Q1, Q2, Q3, Q4, Q5, Q6, Q7 is seven. The electronic switches Q1, Q2, Q3, Q4, Q5, Q6, Q7 can be a N type metal-oxide semiconductor field effect transistor (NMOSFET), a P type metal-oxide semiconductor field effect transistor (PMOSFET), a npn type transistor, and a pnp type transistor.

In one embodiment, the detection circuit 50 can be known detection modules that determine whether the POE ports 10a, 10b, 10c, 10d are connected to the PD 200 or not. The temperature detection circuit 80 can be a thermal resistor, a thermocouple, or other temperature detection modules.

The foregoing disclosure of various embodiments has been presented for the purposes of illustration. It is not intended to be exhaustive or limited to the precise forms disclosed. Many variations and modifications of the embodiments described herein will be apparent to one of ordinary skill in the art in the light of the above disclosure. The embodiments described herein are not to be construed as limiting the following claims.

What is claimed is:

1. An Ethernet power source equipment (PSE) comprising:
a processor;
a plurality of power over Ethernet (POE) ports;
a plurality of port modules, each of the port modules connected to each of the POE ports, respectively, and each of the port modules supplying power to a powered device (PD) via each of the POE ports;
a switch module connected to the processor and the plurality of port modules, the switch module connecting the processor to, or disconnecting the processor from each of the port modules according to control signals output by the processor so that the processor can selectively communicate with each of the port modules;
a detection circuit connected to the processor and the plurality of POE ports, the detection circuit determining whether each of the POE ports is connected to the PD or not, to output a detection signal corresponding to each of the POE ports; and
a power supply module supplying power to the processor, the plurality of port modules, the switch module, and the detection circuit;
wherein the processor controls operation states of the plurality of port modules and the switch module according to the detection signals output by the detection circuit.

2. The Ethernet PSE of claim 1, further comprising:
a fan connected to the power supply module, the fan receiving power from the power supply module; and
a temperature detection circuit detecting an operation temperature of the Ethernet PSE;
wherein the processor is configured to further adjust a rotating speed of the fan according to the operation temperature detected by the temperature detection circuit.

3. The Ethernet PSE of claim 2, wherein the processor controls the power supply module to stop supplying power to the fan in response to the operation temperature being less than a predetermined value.

4. The Ethernet PSE of claim 1, wherein the processor controls the power supply module to stop supplying power to the port module corresponding to the POE port which is not connected to the PD.

5. The Ethernet PSE of claim 1, wherein the switch module comprises a plurality of multiple-way switches.

6. The Ethernet PSE of claim 5, wherein the processor further determines whether the plurality of port modules which are connected to the multiple-way switch are supplied power or not, and the processor controls the power supply module to stop supplying power to the multiple-way switch in response to the plurality of port modules which are connected to the multiple-way switch all not supplied power.

7. The Ethernet PSE of claim 5, wherein the processor controls the power supply module to supply power to the port module corresponding to the POE port which is connected to the PD, and to supply power to the multiple-way switch corresponding to the port module which is supplied power by the power supply module.

8. The Ethernet PSE of claim 1, wherein the power supply module comprises a power supply unit and a plurality of electronic switches, and the processor controls the plurality of electronic switches turning on or off, to control the operation states of the plurality of port modules and the switch module.

* * * * *